United States Patent
Margulies et al.

(10) Patent No.: US 6,803,119 B2
(45) Date of Patent: Oct. 12, 2004

(54) ORIENTED MAGNETIC RECORDING MEDIA ON A NONMETALLIC SUBSTRATE

(75) Inventors: David Thomas Margulies, Gilroy, CA (US); Timothy Martin Reith, San Jose, CA (US); Hoa Do, Fremont, CA (US); Tim Minvielle, San Jose, CA (US); James A. Hagan, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/952,822

(22) Filed: Sep. 13, 2001

(65) Prior Publication Data

US 2003/0049494 A1 Mar. 13, 2003

(51) Int. Cl.$^7$ ................................................. G11B 5/82
(52) U.S. Cl. ...................... 428/668; 428/680; 428/65.3; 428/141; 428/336; 428/694 SG; 428/694 ST
(58) Field of Search ................................ 428/65.3, 336, 428/668, 680, 141, 694 SG, 694 ST

(56) References Cited

U.S. PATENT DOCUMENTS

| | | | |
|---|---|---|---|
| 5,084,152 A | 1/1992 | Lin et al. ............... 204/192.15 |
| 5,384,175 A | 1/1995 | Kojima et al. ................ 428/64 |
| 5,536,585 A | 7/1996 | Futamoto et al. ............ 428/611 |
| 5,685,958 A | 11/1997 | Futamoto et al. ......... 204/192.2 |
| 5,733,370 A | 3/1998 | Chen ........................... 117/105 |
| 5,741,560 A * | 4/1998 | Ross ........................... 427/555 |
| 5,830,584 A | 11/1998 | Chen ........................... 428/611 |
| 5,922,456 A | 7/1999 | Tanahashi et al. .......... 428/332 |
| 6,036,824 A | 3/2000 | Hedgcoth .............. 204/192.16 |
| 6,117,499 A * | 9/2000 | Wong et al. ................. 427/599 |
| 6,150,015 A | 11/2000 | Bertero et al. .............. 428/332 |
| 6,150,016 A | 11/2000 | Song et al. .................. 428/332 |
| 6,174,582 B1 | 1/2001 | Bian et al. .................. 428/65.3 |
| 6,482,505 B1 * | 11/2002 | Bertero et al. .............. 428/212 |
| 6,537,686 B1 * | 3/2003 | Chen ........................... 428/678 |

FOREIGN PATENT DOCUMENTS

| | | | | |
|---|---|---|---|---|
| JP | 4285723 A | 10/1992 | ............ G11B/5/66 |
| JP | 5081637 A | 4/1993 | ............ G11B/5/66 |

* cited by examiner

*Primary Examiner*—Stevan A. Resan
(74) *Attorney, Agent, or Firm*—Lewis L. Nunnelley

(57) ABSTRACT

This invention provides a disk which has an in-plane oriented magnetic recording layer on a glass, ceramic, or other nonmetal substrate and a method for making the disc. A thin layer of texturable NiP is sputtered on the substrate. This NiP layer is textured before the magnetic layer is deposited. The disk combines all the advantages of a glass or ceramic substrate along with the advantages of an oriented magnetic medium.

1 Claim, 2 Drawing Sheets

| Disk | Texture | OR | Mrt (memu) | SNR (dB) | PW50 (nsec) | Thermal Stability (%/decode) | KuV/kT |
|---|---|---|---|---|---|---|---|
| 1 | Yes | 1.5 | 0.35 | 23.2 | 11.2 | 1.7 | 85 |
| 2 | No | 1.0 | 0.29 | 22.6 | 11.5 | 3.5 | 76 |
| 3 | Yes | 1.5 | 0.31 | 23.3 | 11.1 | 2.2 | 76 |

ORIENTED MAGNETIC RECORDING MEDIA ON A NONMETALLIC SUBSTRATE

BACKGROUND OF THE INVENTION

1. Field of the Invention

This invention relates generally to a disk used for magnetic recording in a disk drive and more specifically to an oriented magnetic medium on a non-metallic substrate.

2. Description of the Background Art

Disk drives using magnetic recording of digital information are used for most of the information storage in contemporary computer systems. Disk drives have at least one rotating disk with discrete concentric tracks of data. There is at least one recording head typically including a separate write element and read element for writing and reading the data on the tracks. The recording head is attached to a slider and the slider is attached to a suspension. The combination of the recording head, slider and suspension is called a head gimbal assembly. In addition, there is an actuator which positions the recording head over the specific track of interest. The actuator first rotates to seek the track of interest and after positioning the recording head over that track maintains the recording head in close registration to that track.

The disk in a disk drive includes a substrate and a magnetic layer on the substrate for magnetic recording. Substrates are typically either metal or glass. Metal substrates are typically made from an alloy of aluminum and magnesium. Glass substrates can be made with standard sodium borosilicate glass, harder grades of glass, or known glass composites. Substrates may also be made from silicon or a ceramic material. Silicon and ceramic disks offer many of the same technical advantages as glass but are generally more expensive. The magnetic layer is usually a cobalt based alloy suitable for magnetic recording. Disks generally have other layers in addition to the magnetic layer. There is usually a carbon based overcoat deposited on the magnetic layer for durability. Also there may be other layers disposed between the substrate and the magnetic layer to promote better adhesion or to improve the magnetic properties of the recording layer. One or more underlayers deposited for the purpose of influencing the crystalline growth of the magnetic layer will be called herein a magnetic underlayer. The magnetic underlayer is generally itself non-magnetic and merely influences the properties of the magnetic recording layer.

When using metal substrates it is customary to electrolessly plate an underlayer of NiP from a solution. The NiP underlayer thus deposited generally has a thickness of several microns (typically 3–5 $\mu$m) to cover some of the defects usually encountered in the substrate. A relatively thick layer of NiP is known to accept a mechanical texture. The composition of the NiP layer on a metal substrate using a deposition from solution is typically about 11% P by weight. This deposition method used with metal substrates produces the amorphous form of NiP. The crystalline form of NiP is magnetic and, if present, would degrade the magnetic recording properties of the disk.

Glass substrates have several advantages over metal substrates. Generally the surface of a glass substrate is smoother than the surface of a metal substrate. This is a significant advantage as the spacing between the disk and recording head must decrease as the areal density increases. A second advantage is that glass is a harder material than aluminum and therefore is more resistant to damage arising from inadvertent contact between the slider and the disk. A third advantage of using glass substrates is that glass substrates are stiffer than metal substrates which allows glass substrates to be used at higher rotation speeds. Another advantage of using glass for substrates is that glass has fewer detrimental effects during process temperature excursions compared with metal substrates. These advantages are generally known in the art.

For longitudinal media, orientation from crystallographic effects arises from constraining the c-axis of the magnetic film to lie in the plane of the magnetic layer. This magnetic orientation is normally isotropic within the plane of the magnetic recording layer. If, in addition, the magnetic layer is deposited on a surface which has been textured in a preferentially circumferential direction, then the magnetic orientation will also be preferentially circumferential for magnetic films of practical interest. In this case the orientation will no longer be isotropic within the plane of the magnetic recording layer. The orientation ratio (OR) refers to the ratio of the product of the remanent magnetization and the magnetic film thickness (Mrt) when measured in the circumferential direction relative to the Mrt in the radial direction. An OR of 1.0 means the Mrt is the same measured circumferentially and radially, and the media is said to be two dimensionally isotropic in the film plane. A disk with an OR greater than 1.0 generally has superior magnetic performance compared to isotropic disks. Circumferential in-plane orientation is commonly induced in recording layers on metal substrates by mechanically texturing the substrate or, more commonly, the NiP underlayer. Mechanical texturing on metal substrates leaves small elongated indentations or very small scratches in a generally circumferential direction.

Glass substrates are much more difficult to mechanically texture. Because glass is relatively brittle, texturing glass directly generally results in fracture pits, gouges, irregular scratches and other unacceptable artifacts. It is known to photolithographically produce grooves in a glass substrate, however this method is expensive and more difficult than mechanical texturing. Also the feature size available from a photolithographic process is generally larger than desired. As a consequence, glass substrates are rarely textured and the magnetic layers on glass substrates rarely have in-plane circumferential orientation.

There is needed an improved magnetic medium having orientation on a glass substrate and a practical method of making the medium with circumferential orientation.

SUMMARY OF THE INVENTION

An embodiment of this invention provides a disk which has an in-plane circumferential oriented recording layer on a glass or ceramic substrate. This disk includes a glass substrate and a NiP textured layer sputter deposited on the substrate. The NiP layer is textured in a substantially circumferential direction. The finished disk has a magnetic layer containing cobalt formed on the NiP textured layer, and an overcoat formed on the magnetic layer. The NiP textured layer is thin enough to preserve the smoothness of the substrate. The composition of Ni and P in the NiP layer is adjusted to avoid the ferromagnetic form of NiP.

Another embodiment of this invention is a disk drive, including a motor, a disk connected with the motor, an actuator, a head gimbal assembly attached to the actuator, and a recording head for magnetic recording on the disk. In this embodiment the disk has a glass substrate, a NiP textured layer deposited over the substrate, and the NiP textured layer is textured in a substantially circumferential direction. A disk drive containing the oriented disk shows improved magnetic performance.

The disk representing an embodiment of the invention combines the advantages of a rigid nonmetallic substrate along with the advantages of an oriented magnetic medium. Other aspects and advantages of the present invention will become apparent from the following detailed description along with the drawings, showing by way of examples the principles of the invention.

DETAILED DESCRIPTION OF THE INVENTION

The present invention provides a disk which has an in-plane circumferential oriented recording layer on a glass or ceramic substrate. An oriented recording medium on a glass substrate has been difficult to achieve in the past because of the difficulty in texturing the substrate.

Figures 1, 2:
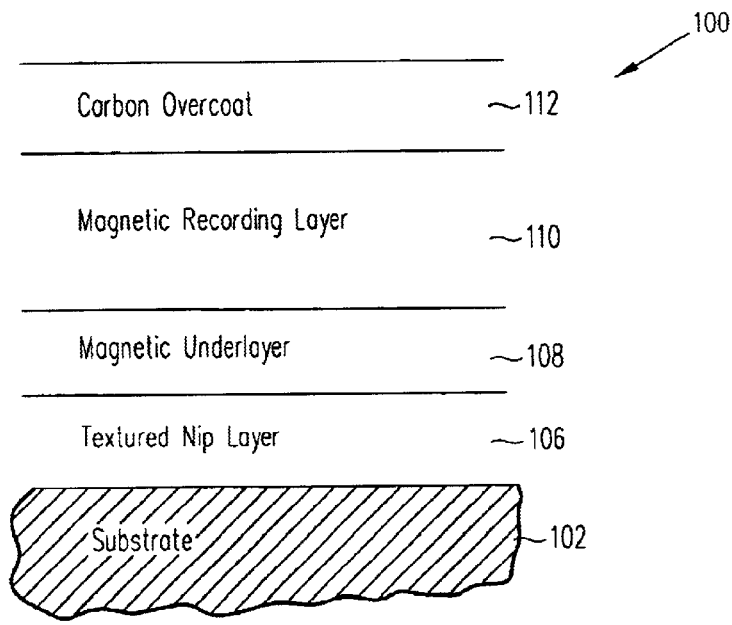
FIG. 1 shows a cross section of one embodiment of a disk according to the present invention.
FIG. 2 shows a table containing the evaluation data comparing disks having oriented magnetic layers on glass substrates with isotropic magnetic layers on glass substrates.

FIG. 1 shows a cross sectional view of a preferred embodiment of the present invention. The disk 100 is comprised of a nonmetallic substrate 102. The substrate 102 is polished using known, conventional means to achieve a smooth surface. A layer 106 formed from NiP is deposited on the substrate 102 and is called the textured layer. The preferred method of depositing the NiP layer 106 is by non-biased sputter deposition. The NiP 106 is deposited and subsequently mechanically textured using known abrasive polishing techniques to achieve substantially circumferential texturing. It is also possible to press or stamp a textured surface into the NiP layer 106. An optional magnetic underlayer 108 has been deposited on the NiP textured layer. The magnetic recording layer 110, commonly comprised of a cobalt alloy, is formed on the magnetic underlayer 108 if present, or directly on the NiP layer 106. Finally a layer of overcoat 112, usually carbon based, is deposited on the magnetic layer 110.

The main function of the NiP layer 106 is to accept a textured topography from a texturing process. The NiP layer 106 is preferably thin enough to preserve the smoothness of the underlying surface. Generally the NiP layer 106 is less than about 300 nm thick and perhaps as thin as about 5 nm thick. Another reason to keep the textured layer 106 relatively thin is that as the thickness of the textured layer is reduced, the take off height is also reduced. The take off height of the disk is the height above the surface when a slider begins to fly free of contact with the disk. Generally it is desired to minimize the take off height.

Using NiP as the textured layer 106 has the advantage that the intrinsic adhesion to the substrate 102 is adequate. Because the NiP layer 106 is thin, additional care should be exercised during the texturing process to prevent texturing damage to the substrate 102.

The composition of NiP in the textured layer 106 is important. It has been found that a suitable method of deposition of NiP on glass substrates is a non-biased sputtering process onto an insulating substrate. Sputtering is a better method for controlling layers which are very thin. Non-bias sputtering is preferred over conventional bias sputtering because of the insulating substrate. Film growth in a sputtering method is generally improved when the substrate is heated above 250° C. However, when NiP is deposited on substrates heated above 250° C. for compositions where the amount of P in NiP is less than about 13% by weight, the NiP layer becomes crystalline. The crystalline form of NiP is not acceptable because it is ferromagnetic. If any layer other than the magnetic recording layer 108 is magnetic the recording performance of the magnetic recording layer 108 is generally disturbed. Therefore the preferred concentration of P in deposited NiP is preferably greater than about 13%.

Figure 3A:
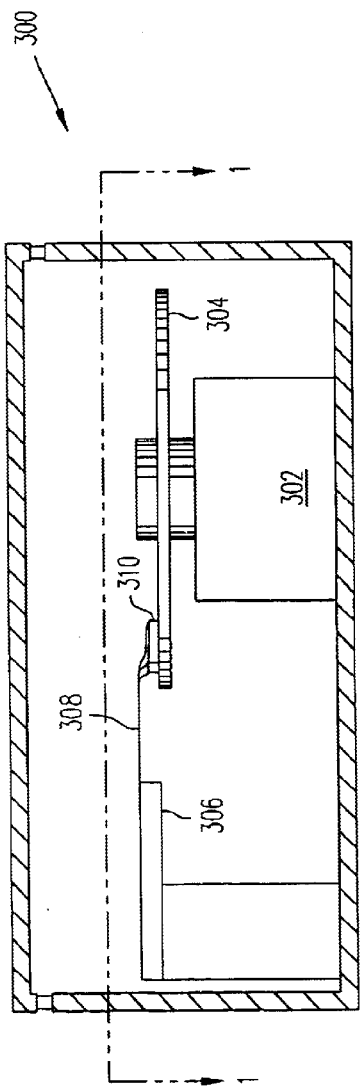
FIG. 3a shows a cross sectional view of a disk drive having an embodiment of an oriented disk according to the present invention.
Figure 3B:
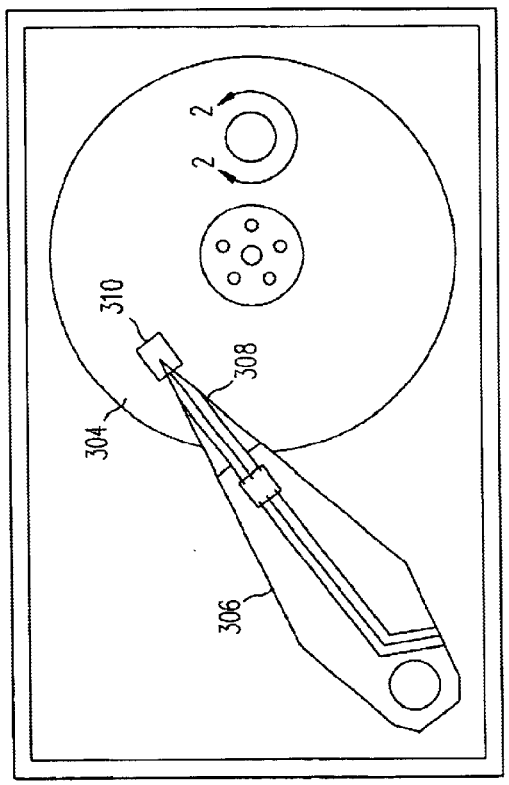
FIG. 3b shows a top down view of the disk drive; and, the disc drive.
Figure 3C:
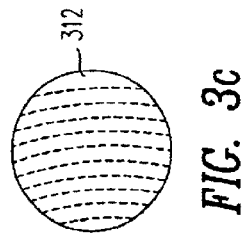
FIG. 3c shows an enlarged view of the disk surface in the disk drive.

A disk drive containing the oriented disk on a glass substrate is shown in FIGS. 3a, 3b, and 3c. The cross sectional view of the disk drive 300 shown in FIG. 3a shows a motor 302 and a disk 304 connected with the motor 302. The disk 304 according to an embodiment of the present invention has a glass substrate and a NiP textured layer sputter deposited over the substrate. The NiP textured layer is textured in a substantially circumferential direction. The disk drive 300 also has an actuator 306 and a head gimbal assembly 308 attached to the actuator 306. The head gimbal assembly 308 has a recording head 310 for magnetic recording on the disk 304. A top down view of the disk drive 300 according to the 1—1 line in FIG. 3a is shown in FIG. 3b. An enlarged area of the disk surface according to the line 2—2 in FIG. 3b is shown in FIG. 3c. In FIG. 3c the texture features 312 which may be substantially continuous or discontinuous are shown to be substantially circumferential.

To reduce the present invention to practice, three sample disks were made. The disks had a glass substrate, a 150 nm NiP textured layer sputter deposited on the glass substrate, a magnetic underlayer, a cobalt-platinum based magnetic recording layer deposited on the magnetic underlayer, and a diamond like carbon (DLC) overcoat deposited on the magnetic layer. For one group of disks the NiP underlayer was mechanically textured and for another group the NiP underlayer was not textured. A typical value of OR for the textured disks was 1.5 and a typical value of OR for the non-textured disks was 1.0.

Data collected on three individual disks are shown in FIG. 2. These disks all had a NiP layer sputtered under the same conditions. A conventional recording head was used to make the recording measurements. The same sputtering target was used for the magnetic layer in all three disks. Disks 1 and 2 had the same thickness of the magnetic layer. The fact that the remanent moment-thickness product (Mrt) differs for disks 1 and 2 indicates that the squareness of the remanent moment (Mr) versus field loop is higher for the oriented disk 1 since the saturated magnetization is the same. The thickness of the magnetic recording layer for disk 3 was intentionally made thinner than for disks 1 and 2 in order to render the Mrt of disk 3 approximately the same as disk 1. The signal to noise ratio (SNR) is not much different for the two textured disks. However the orientated disks 1 and 3 were improved in SNR relative to the isotropic disk 2 by approximately 0.6–0.7 dB. The width of the readback pulse (PW50) is also improved on the textured disks 1 and 3 compared with the isotropic disk 2. The thermal stability of the disks was measured with a SQUID magnetometer with an imposed 500 Oe external field to simulate the demagnetization field in a written transition. The isotropic disk 2 has noticeably worse thermal stability compared with the oriented disks 1 and 3. A thermal stability difference between the oriented disks 1 and 3 is related to the difference in Mrt for these two disks. Finally, the KuV/kT values are shown for the disks. Ku is the magnetocrystalline anisotropy of the magnetic layer, V is the effective domain volume, k is Boltzman's constant, and T is the temperature (Kelvin). KuV/kT is a quantity related to thermal stability. The fact that the isotropic disk 2 and the oriented disk 3 have the same KuV/kT value and yet the oriented disk has an appreciable improvement in measured thermal stability indicates that the presence of orientation generally improves thermal stability.

From the foregoing it will be appreciated that an embodiment of the invention provides a circumferentially oriented recording disk having a glass substrate. By using a sputtering method for deposition of thin, compositionally controlled NiP films, the improved magnetic performance of disks using glass substrates can be realized. While the invention has been described above in connection with preferred embodiments thereof and as illustrated by the drawings, those with skill in the art will readily recognize alternative embodiments of the invention can be easily produced which do not depart from the spirit and scope of the invention as defined in the following claims.

We claim:

1. A disk for use in a disk drive, comprising:

a glass substrate;

a nonferromagnetic NiP textured layer sputtered directly on said substrate while said substrate is heated above 250 degrees C., said NiP textured layer being textured in a substantially circumferential direction, said NiP textured layer having a thickness less than 300 nm, wherein the composition of P in said NiP layer is greater than 13%;

an in-plane circumferentially oriented magnetic layer formed over said NiP textured layer, said magnetic layer comprising cobalt; and, an overcoat formed over said magnetic layer.

* * * * *